(12) United States Patent
Abe et al.

(10) Patent No.: US 6,880,104 B2
(45) Date of Patent: Apr. 12, 2005

(54) COMPUTER SYSTEM FOR MUTUAL COMMUNICATION THROUGH NETWORK AND ITS MEMORY MANAGEMENT METHOD

(75) Inventors: Shinji Abe, Tokyo (JP); Shinji Ueno, Tokyo (JP)

(73) Assignee: NEC Corporation, Tokyo (JP)

(*) Notice: Subject to any disclaimer, the term of this patent is extended or adjusted under 35 U.S.C. 154(b) by 431 days.

(21) Appl. No.: 10/022,271

(22) Filed: Dec. 20, 2001

(65) Prior Publication Data

US 2002/0083368 A1 Jun. 27, 2002

(30) Foreign Application Priority Data

Dec. 21, 2000 (JP) ........................................ 2000-388046

(51) Int. Cl.[7] .............................................. G06F 11/00
(52) U.S. Cl. .............................................. 714/24; 714/5
(58) Field of Search ............................. 714/14, 22, 24, 714/5; 709/203; 713/300

(56) References Cited

U.S. PATENT DOCUMENTS

| | | | | |
|---|---|---|---|---|
| 5,448,719 A | * | 9/1995 | Schultz et al. ................. | 714/5 |
| 6,084,813 A | * | 7/2000 | Kikuchi et al. ............. | 365/222 |
| 6,317,657 B1 | * | 11/2001 | George ....................... | 700/286 |
| 6,684,339 B1 | * | 1/2004 | Willig ......................... | 713/300 |
| 6,691,248 B1 | * | 2/2004 | Nishijima et al. ............ | 714/14 |
| 2004/0078467 A1 | * | 4/2004 | Grosner et al. ............. | 709/226 |

FOREIGN PATENT DOCUMENTS

| JP | H01-237742 | 9/1989 |
|---|---|---|
| JP | H11-328045 | 11/1999 |

* cited by examiner

*Primary Examiner*—Scott Baderman
*Assistant Examiner*—Anne L. Damiano
(74) *Attorney, Agent, or Firm*—Sughrue Mion, PLLC

(57) ABSTRACT

In the memory management method, when a failure is detected in the power supplied to a protective memory, a control toward the memory is cut off from a CPU and the power supply is switched to a standby power before the protective memory has some damaging effect; after solution of the power failure, the switching is finished, the control toward the memory is returned to the CPU, and the power supply is returned to an ordinal one; write completion of data is notified to the client at a time when the data sent from the client has been written into the protective memory; whether the last termination is abnormal or normal is checked at the activation; when the last termination is abnormal, the protective memory is returned after memories other than the protective memory are initialized at the activation; and when the last termination is normal, the protective memory is returned and thereafter all the memories are initialized at the activation.

25 Claims, 7 Drawing Sheets

COMPUTER SYSTEM FOR MUTUAL COMMUNICATION THROUGH NETWORK AND ITS MEMORY MANAGEMENT METHOD

BACKGROUNDS OF THE INVENTION

1. Field of the Invention

The present invention relates to memory management of a computer system, and more particularly to a computer system for efficiently managing a memory in NAS (Network Attached Storage), a file server, and the like and its memory management method.

2. Description of the Related Art

Hitherto, various computer systems for sending and receiving data between a client and a server through a LAN or a communication network are in wide use. In these computer systems, there is a kind of system which uses a server to register a file and the other data, like a system such as File Server, NAS (Network Attached Storage), or the like.

The NAS is a storage sub-system which contains a network interface. The NAS can be used by directly connecting a storage sub-system with a lot of hard disk drives mounted there to a network, like the RAID structure. Since the NAS can share one storage among a plurality of servers, it has such an advantage that processing can be continued in the event of a failure.

FIG. 6 is a block diagram showing the structure of the conventional NAS server. In a computer system such as the File Server, the NAS, and the like, the processing for reading out the stored data by a client 200 starts accepting a read access request of a file stored in a HDD 51 through a NIC (Network Interface Card) 60 from the client 200, hence to have access to a predetermined HDD 51 through a Fiber Channel (FC) controller 50 and the like, and ends by returning the data to the client 200.

While, in the case of a write request from a client 200, the NAS server receives data from the client 200, writes the data into the HDD 51, and notifies the client 200 that the write processing has been normally completed, thereby finishing the whole write processing.

In this processing of a write request, there has been, hitherto, used a method for improving the processing performance of the NAS by informing a client 200 of the write completion more quickly.

Specifically, at the instant that the write data received from a client 200 is once stored in a memory, the client 200 is notified of the write completion without waiting for the completion of writing into the HDD 51.

Writing into the HDD 51 that is the only mechanical element requires the longest processing time in the whole write operation. The write data once stored in a memory is collectively written into the HDD 51 when the load of the HDD 51 is comparatively low, thereby making it possible to finish the write processing in a short time at a client side. In this case, the performance of the NAS is recognized to be high. At the NAS side, since the processing of writing the write data into the HDD 51 can be collectively processed, it is possible to improve efficiency with high processing performance.

This conventional method, however, has a problem that the data to be stored in the HDD 51 may disappear before being stored there when a server is broken down due to unexpected power-down and the like.

Further, once the client 200 receives a notice of completion of the write data, there is a case where the write data having been held so far is abandoned, because it is not necessary to hold the same write data. This becomes a situation where the data to be stored is held neither in the NAS server nor in the client, which causes lost data.

As the conventional technique to cope with this problem, a method for holding the write data in an NVRAM (Nonvolatile Memory) is widely in use. For example, the NVRAM is formed on a PCI card, as illustrated in an example of FIG. 6, thereby forming an NVRAM card.

FIG. 7 is a flow chart showing a flow of the conventional NAS write data in the above case. A NAS server sequentially transfers the write data received from a client 200 and stored in a memory 31 (Step 703) to the NVRAM card on a PCI bus (Step 704). After confirming that the data is written into the NVRAM (Step 705), the NAS server returns a completion notice to the client (Step 706).

The above-mentioned conventional technique, however, has the following problems.

In these days, since the speed of a network is improved thanks to the advent of the Giga bit Ether and the like, the load of the NAS server is increased, thereby failing to keep up the processing speed. This is because of the shortage of the bandwidth in a PCI bus and a memory bus in addition to the shortage of the TCP/IP processing speed of a network.

For example, a write request from a client needs several data transfer on the PCI bus in the above-mentioned method using the NVRAM card, which causes the shortage of the bandwidth in a bus.

SUMMARY OF THE INVENTION

A first object of the present invention is to provide a computer system and its memory management method which can monitor the power supply to a main memory and switch a control of the main memory and the power supply immediately in the event of power-down, thereby nonvolatilizing the main memory itself without spoiling the processing speed of the memory, effectively preventing the loss of data caused by unexpected power-down and reset, and processing the write data from a client more quickly and more safely in the NAS server and the File Server.

A second object of the present invention is to provide a computer system and its memory management method in which it is not necessary to transfer the write data from a memory to the NVRAM card since the main memory itself is nonvolatilized, compared with the conventional structure of putting the NVRAM card on the PCI bus, thereby decreasing the load of the PCI bus and enabling a lot of data processing from a client, with high performance.

A third object of the present invention is to provide a computer system and its memory management method capable of extremely improving the write processing ability in response to a client, by notifying the client of the write completion at the instant of receiving and writing data in a memory, instead of notifying the client of the write completion when the data from a memory has been just written into the hard disk or the NVRAM card after the memory receives the transmission data from the client.

According to the first aspect of the invention, a server for establishing communication upon receipt of access from a client terminal through a network, comprises a memory protection unit for protecting data stored in a volatile memory to be protected, in the event of a power failure, the memory protection unit comprises power monitoring means for detecting a power failure supplied to the above protective memory, and switch controlling means for switching a control and power supply toward the protective memory, wherein when a failure is detected in the power supplied to the protective memory, the control toward the memory is switched to a side of the memory protection unit and the power supply is switched to a standby power before the protective memory has some damaging effect.

In the preferred construction, the switch controlling means finishes the switching, returns the control toward the memory to a CPU, and returns the power supply to an ordinal one, after solution of the power failure.

In another preferred construction, the server notifies the client of write completion of data at a time when the data sent from the client has been written into the protective memory.

In another preferred construction, the server checks whether the last termination is abnormal or normal, at the activation, instructs the memory protection unit to return the protective memory after memories other than the protective memory are initialized at the activation, when the last termination is abnormal, while instructs the memory protection unit to return the protective memory and thereafter initializes all the memories at the activation when the last termination is normal.

In another preferred construction, the switch controlling means switches the memory to a low power mode at a time of switching the power supply toward the memory to the standby power.

In another preferred construction, the memory protection unit performs backup processing on the data stored in the memory, in response to a user's operation, after the switching.

In another preferred construction, the protective memory is SDRAM or DIMM.

In another preferred construction, the memory protection unit has a switch on an I2C bus between SPD of the protective memory that is the DIMM and a memory controller, to cut off a connection between the SPD and the memory controller, in the above switched state.

In another preferred construction, the memory protection unit controls the SPD of the protective memory through the I2C bus.

In another preferred construction, the server unit is Network Attached Storage or File Server.

According to the second aspect of the invention, a computer system for establishing mutual communication between a client terminal and a server through a network, wherein the server has a memory protection unit for protecting data stored in a volatile memory to be protected in the event of a power failure, the memory protection unit comprising power monitoring means for detecting a power failure supplied to the above protective memory, and switch controlling means for switching a control and power supply toward the protective memory, in which when a failure is detected in the power supplied to the protective memory, the control toward the memory is switched to a side of the memory protection unit and the power supply is switched to a standby power before the protective memory has some damaging effect.

In the preferred construction, the switch controlling means finishes the switching, returns the control toward the memory to a CPU of the server, and returns the power supply to an ordinal one, after solution of the power failure.

In another preferred construction, the server notifies the client of write completion of data at a time when the data sent from the client has been written into the protective memory.

In another preferred construction, the server checks whether the last termination is abnormal or normal, at the activation, instructs the memory protection unit to return the protective memory after memories other than the protective memory are initialized at the activation, when the last termination is abnormal, while instructs the memory protection unit to return the protective memory and thereafter initializes all the memories at the activation when the last termination is normal.

In another preferred construction, the switch controlling means switches the memory to a low power mode at a time of switching the power supply toward the memory to the standby power.

In another preferred construction, the server is Network Attached Storage or File Server.

According to another aspect of the invention, a memory management method of a server for establishing communication upon receipt of access from a client terminal through a network, comprising the following steps of detecting a power failure supplied to the above protective memory, and switching a control and power supply toward the protective memory, in which when a failure is detected in the power supplied to the protective memory, the control toward the memory is cut off from a CPU and the power supply is switched to a standby power before the protective memory has some damaging effect, so as to protect the data stored in the protective volatile memory, in the event of a power failure.

In the preferred construction, the memory management method comprises a step of finishing the switching, returning the control toward the memory to a CPU, and returning the power supply to an ordinal one, after solution of the power failure.

In another preferred construction, the memory management method comprises a step of notifying the client of write completion of data at a time when the data sent from the client has been written into the protective memory.

In another preferred construction, the memory management method comprises a step of checking whether the last termination is abnormal or normal, at the activation, a step of returning the protective memory after initializing memories other than the protective memory at the activation, when the last termination is abnormal, and a step of returning the protective memory and thereafter initializing all the memories at the activation when the last termination is normal.

In another preferred construction, the memory management method comprises a step of switching the memory to a low power mode at a time of switching the power supply toward the memory to the standby power.

In another preferred construction, the memory management method comprises a step of performing backup processing on the data stored in the memory, in response to a user's operation, after the switching.

In another preferred construction, the protective memory is SDRAM or DIMM.

In another preferred construction, the memory management method comprises a step of, with a switch provided on an I2C bus between SPD of the protective memory that is the DIMM and a memory controller, cutting off a connection between the SPD and the memory controller, in the switched state.

In another preferred construction, the memory management method comprises a step of controlling the SPD of the protective memory through the I2C bus.

According to a further aspect of the invention, a memory management program of a server for establishing communication upon receipt of access from a client terminal through a network, comprising the following functions of detecting a power failure supplied to a protective memory, and switching a control and power supply toward the protective memory, in which when a failure is detected in the power supplied to the protective memory, the control toward the memory is cut off from a CPU and the power supply is switched to a standby power before the protective memory has some damaging effect, so as to protect the data stored in the protective volatile memory, in the event of a power failure.

In the preferred construction, the memory management program comprises a function of finishing the switching, returning the control toward the memory to the CPU, and returning the power supply to an ordinal one, after solution of the power failure.

In another preferred construction, the memory management program comprises a function of notifying the client of write completion of data at a time when the data sent from the client has been written into the protective memory.

In another preferred construction, the memory management program comprises a function of checking whether the last termination is abnormal or normal, at the activation, a function of returning the protective memory after initializing memories other than the protective memory at the activation, when the last termination is abnormal, and a function of returning the protective memory and thereafter initializing all the memories at the activation when the last termination is normal.

Other objects, features and advantages of the present invention will become clear from the detailed description given herein below.

BRIEF DESCRIPTION OF THE DRAWINGS

The present invention will be understood more fully from the detailed description given herein below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the present invention, an easy control circuit (memory protection unit 10) for protecting data stored in a main memory and nonvolatilizing it is added to a general computer system having a CPU, a memory, an input/output unit, and the like, thereby nonvolatilizing one part of the main memory to prevent the data loss at unexpected power-down, and it is used for NAS (Network Attached Storage) and the File Server, thereby speeding up response to a client.

Figure 6:
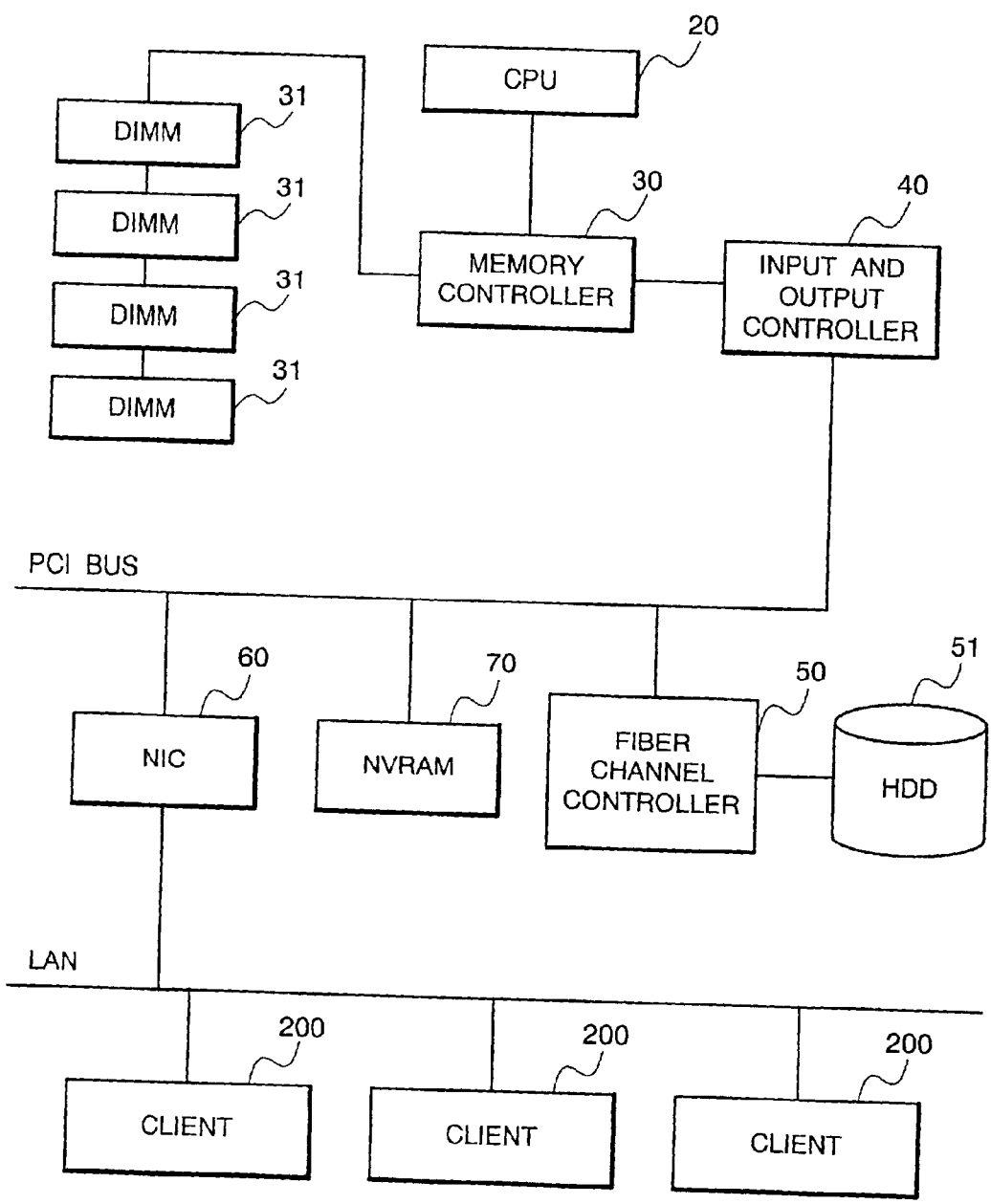
FIG. 6 is a block diagram showing the structure of the conventional NAS.

In the NAS and the File Server (hereinafter, both are collectively referred to as NAS, refer to FIG. 6 as for the basic structure) having a hard disk interface such as SCSI and a fiber channel (FC) and NIC (Network Interface Card) in a computer system, in order to improve the performance, data is once kept in NVRAM (Nonvolatile Memory) before writing the data into ILDD (Hard Disk Drive) when a client issues a write request, and at this point, the client is notified that the write request has been normally completed, and thereafter, the data is written into the HDD from the NVRAM.

In the present invention, instead of the conventional NVRAM under the PCI bus, an easy control circuit (memory protection unit 10) is added to a memory interface of general chip set, thereby nonvolatilizing the main memory and realizing the processing of high-performance NAS.

Figure 1:
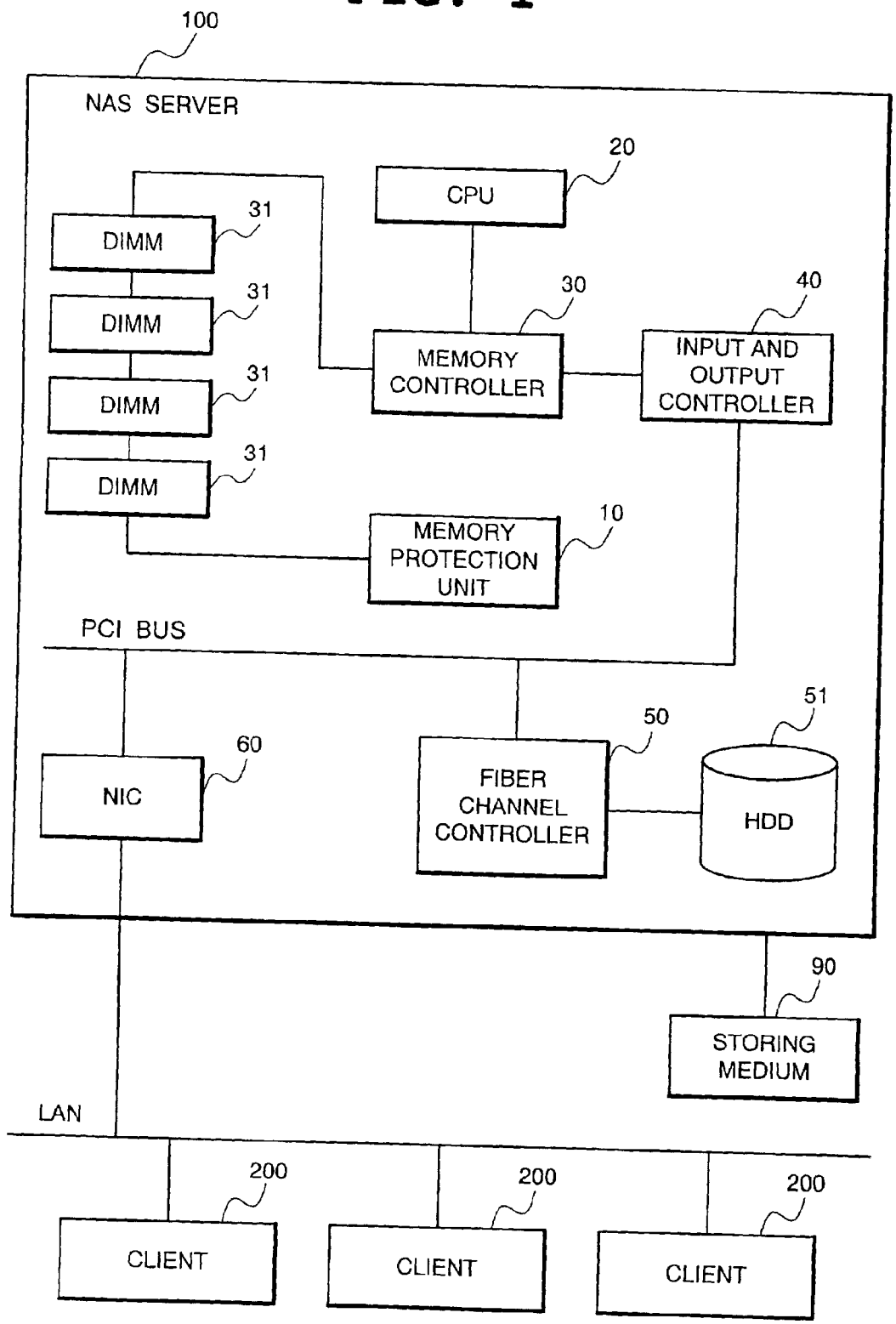
FIG. 1 is a block diagram showing the structure of NAS according to a first embodiment of the present invention.
Figure 2:
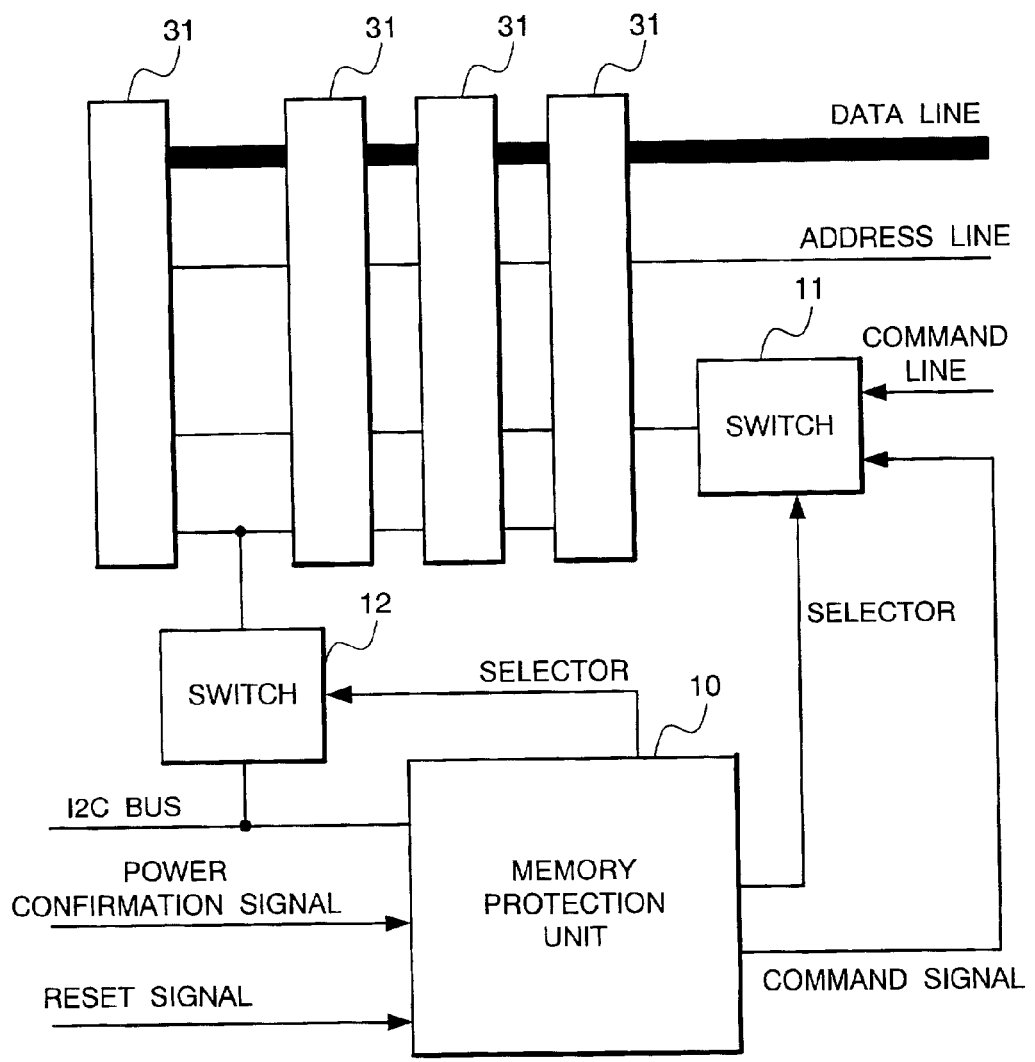
FIG. 2 is a block diagram showing the structure of memory protection unit for nonvolatilizing a main memory in the first embodiment of the present invention.

FIG. 1 is a block diagram showing the structure of a NAS server 100 according to the first embodiment of the present invention, and FIG. 2 is a block diagram showing the structure of a memory protection unit 10 according to the embodiment for nonvolatilizing a main memory.

Although SDRAM (indicating general SDRAM, and DDR SDRAM) is adopted as a memory in this embodiment, the type of a memory is not especially restricted to the SDRAM, but a method of the present invention can be adopted even in the case of the other memories. A bank signal and a command signal of the memory interface and a bank signal and a command signal from the memory protection unit (main memory nonvolatilizing control circuit, MNC) 10 are connected to SDRAM DIMMs 31 for backup (to be protected) through two-to-one switches.

The memory protection unit 10 can directly control the DIMMs 31 by controlling a select signal of each switch 11 and 12. A signal of I2C bus which is connected to SPD of the DIMMs 31 so as to control a power confirmation signal and a reset signal for detecting unexpected abnormal power-down and reset and control a select signal of the switch from the outward, is also connected to the memory protection unit 10.

The power of the memory protection unit 10 and the DIMMs 31 that are backup objects is connected to the battery of a backup power, hence to assure the data backup in the DIMMs 31 at unexpected power-down.

Namely, when detecting the unexpected abnormal power-down and reset, the memory protection unit 10 immediately switches the switches 11 and 12, hence to move a control right of the DIMMs 31 from chip set to the memory protection unit 10, and a determined sequence command is issued to the DIMMs 31 to set the DIMMs 31 in low power mode. Since there is a deviation of some milliseconds between a notice of the power-down from the power modules and the actual power-down provided to the motherboard, there is enough time for the transition toward the low power mode. Since the power consumption of the memory protection unit 10 where the clock supply is stopped after the power-down and the power consumption of the DIMMs 31 coming into the low power mode is very little, backup for a long time is possible.

When detecting return of the power or release of reset respectively from the power confirmation signal or the reset signal, the memory protection unit 10 switches the switch connected to the memory interface, so to return a control right of the DIMM from the memory protection unit 10 to the chip set.

The BIOS confirms the condition of the last system termination at activation of NAS, and reads a flag within NVRAM for discriminating whether it is the ordinal shut-down or reset, or unexpected abnormal power-down or reset. In the ordinal case, it continues initialization of the DIMM, while in the abnormal case, it performs no initialization.

In the embodiment of connecting the I2C bus for SPD to the memory protection unit 10, a switch connected to the memory interface of the DIMMs 31 that are the backup objects is switched to a side of the memory protection unit 10 also after the power return, and a control right of the backup-objective DIMMs 31 is not passed to the chip set until the BIOS and the OS gain access to the memory protection unit 10 through the I2C. Namely, there is also a method of making the backup-objective DIMMs 31 invisible to the chip set, enabling a control separate from the volatile main memory.

As mentioned above, by adding simple hardware (or, by the software control thereof), a notice of the write completion can be issued to the client side at a time of writing the write data into the main memory nonvolatilized, and the conventional data transfer from the main memory to the PCI NVRAM card is not necessary, thereby improving the performance of NAS.

Since the write data transfer to the NVRAM on the PCI bus becomes unnecessary, the data transfer bandwidth on the whole NAS system is effectively used, thereby improving the throughput.

A function of each unit of a computer system according to the embodiment will be described in detail. Though a description will be made by using the DIMM of the SDRAM as a main memory (to be protected) for backup in this embodiment, the type of a memory is not restricted to this.

The NAS server 100 comprises a CPU 20, a memory controller 30 which a plurality of DIMMs 31 that are main memories are connected to, for controlling the DIMMs, and an input and output controller 40 which a NIC (Network Interface Card) 60 and a fiber channel controller 50 with HDD (Hard Disk Drive) 51 connected there to be controlled are connected to, for controlling the whole input and output, and it is connected to a plurality of clients 200 through LAN.

The memory controller 30 and the input and output controller 40 are general chip sets, and they are not provided with a function of nonvolatilizing the main memory of the embodiment.

The memory protection unit (main memory nonvolatiliz-ing control circuit, MNC) 10 is connected to the DIMMs 31 to be nonvolatilized for backup. The memory protection unit 10 is provided with a very simple internal logic, and it can be formed by a programmable logic circuit, for example, FPGA and the like at a low cost.

With reference to the detailed view around the DIMMs 31 and the memory protection unit 10 in FIG. 2, an address line and a data line connected to the memory controller 30 and a command line through the switch are connected to the plurality of DIMMs 31.

A power confirmation signal for detecting the power-down and the power-on, a reset signal for detecting reset, a command line for controlling the backup-objective DIMMs 31 instead of the memory controller, a selector of the switch 11, a selector of the switch 12, and the I2C bus for control-ling switching of the switches according to the software, are connected to the memory protection unit 10. The I2C bus is originally to read the SPD on the DIMMs 31 and it is an indispensable bus if it is a chip set supporting the SDRAM.

The processing operations of the whole computer system of the embodiment will be described this time.

The NAS server 100 is a server to provide a file system through a network, which enables the client 200 to gain access to the HDD 51 through the LAN.

When the client 200 reads a file within the HDD 51, a read request from the client 200 is notified to the CPU 20 through the LAN and the NIC. The CPU 20 reads out the content of the file to be read from the HDD 51 through the input and output controller 40 and the fiber channel controller 50, and returns the read data to the client 200 through the NIC 60. As mentioned above, the same operation as conventional one will be performed in the case of reading data from NAS.

Figure 3:
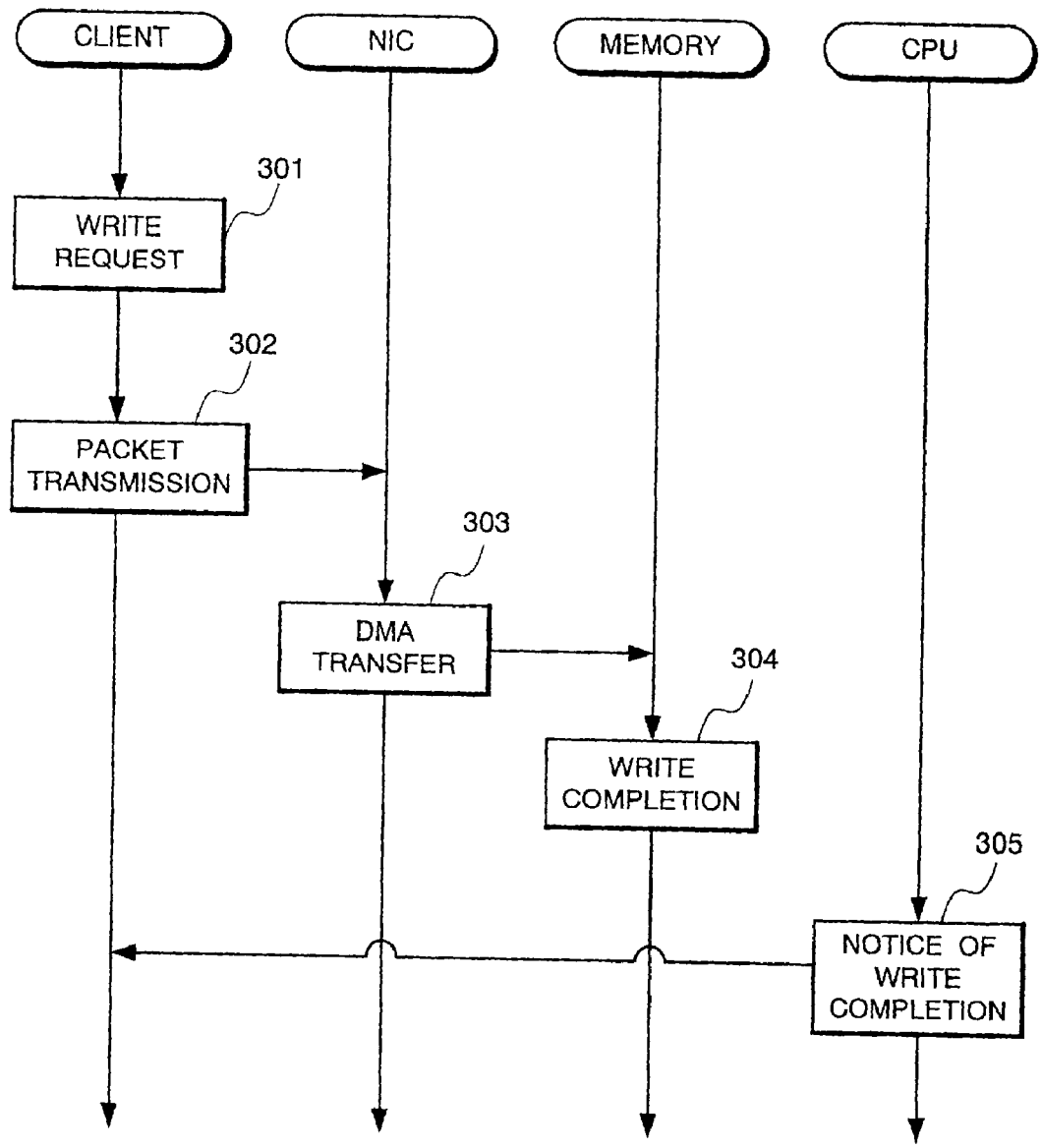
FIG. 3 is a flow chart showing a flow of write data of the NAS according to the first embodiment of the present invention.

FIG. 3 is a flow chart showing the flow of the write data of NAS according to the embodiment of the present invention.

With reference to FIG. 3, when the client 200 writes a file into the HDD 51, the write data is once stored in the backup-objective DIMMs 31 through the NIC 60 (Steps 302 and 303).

Since the backup is assured in the DIMMs 31, the CPU 20 immediately issues a notice of the write completion to the client 200 through the NIC 60 (Step 305) when the regis-tration into the DIMMs 31 is completed (Step 304).

Thereafter, the write data stored within the DIMMs 31 is written into a predetermined position of the HDD 51 at a proper chance, thereby finishing a series of write processing.

Figure 7:
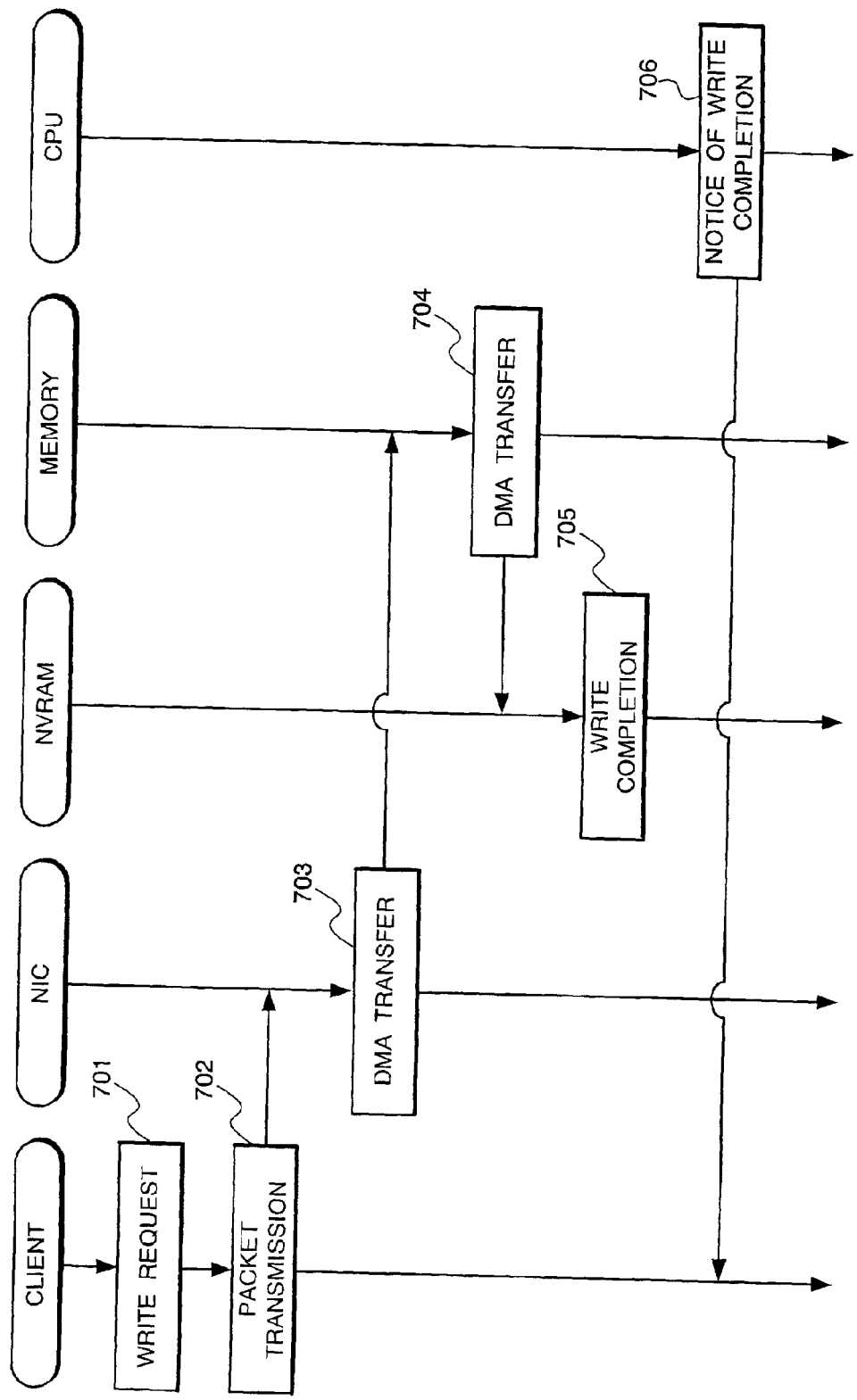
FIG. 7 is a flow chart showing a flow of the write data of the conventional NAS.

By comparison between the conventional data flow shown in FIG. 7 and the data flow of the embodiment shown in FIG. 3, it is found that the processing is more shortened than the conventional one because the data stored in the main memory can be assured in the embodiment, a notice of the write completion can be issued to the client 200 more quickly, and that the write processing from a view of the client 200 side is improved. Further, the data passing amount on the PIC bus is reduced in the embodiment, which results in decreasing the load of the PCI bus.

Although it is not illustrated in the flow charts of FIG. 3 and FIG. 7, there actually occurs the data transfer for writing the write data into the HDD 51 from the memory (DIMM 31 or NVRAM 70). Therefore, it is very important on the performance to decrease the load of the PCI bus.

The backup method of the hardware will be described in the case of unexpected abnormal power-down and reset.

Here, SDRAM is assumed as the DIMMs 31. At the normal operation, the command line from the memory controller is connected to the backup-objective DIMMs 31 through the switch 11. Similarly, the I2C bus for reading SPD on the DIMMs 31 is connected to the DIMMs 31 through the switch 12.

When detecting the abnormal power-down according to the power confirmation signal, or when detecting the abnormal reset according to the reset signal, the memory protection unit 10 controls the command line, so to immediately connect the command line to the backup-objective DIMMs 31 according to the switch selector signal, hence to disable a control from the memory controller 30. Similarly, the I2C bus is cut off according to the switch selector signal, hence to prevent the memory controller 30 from recognizing the existence of the I2C bus.

The memory protection unit 10 waits for "20T", that is a time when the DIMMs 31 are assumed to be idle, and sets the backup-objective DIMMs 31 at the low power mode through the command signal. Here, "T" indicates the number of clock turns.

Figure 4:
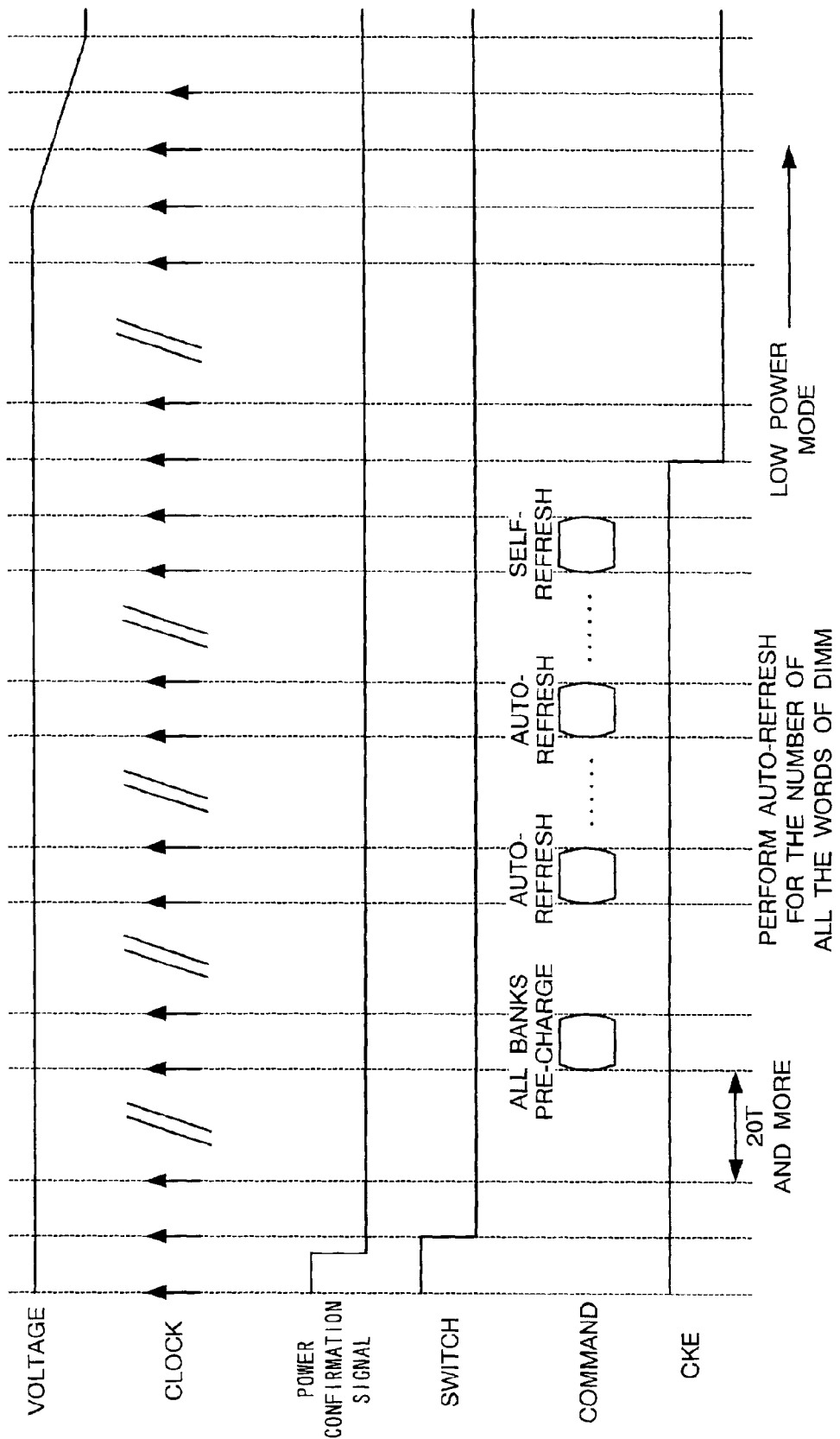
FIG. 4 is a timing chart for use in describing the operation at abnormal power-down of the NAS according to the first embodiment of the present invention.

FIG. 4 is a timing chart for use in describing the operation at the abnormal power-down of NAS according to the embodiment, as follows.

(1) As soon as the memory protection unit 10 detects negate of the power confirmation signal PowerGood, it switches the select of each switch 11 and 12, so to move a control right of the DIMMs to the memory protection unit 10.

(2) Considering that the DIMMS are under some operation according to the memory controller, wait of about 20T is interlaid.

(3) Pre-charge is issued to all the banks of the DIMMs.

(4) Auto refresh is issued to all the words of the DIMMS. For example, if it is the DIMM constituting of 512 Mbit, it is necessary to issue the auto-refresh 8192 times.

(5) Self-refresh is issued and CKE is deasserted.

According to the above procedure, the DIMMs 31 turn into the low power mode and the power supply is switched to from a battery. Thereafter, even if the power-down or the clock stop occurs, the data within the DIMMs 31 is assured as long as the battery can supply the power.

Since FIG. 4 is a view only for use in describing the case of adopting SDRAM as a main memory, in the case of adopting a memory other than this, the operation conforms to the low power mode of the adopted memory.

Figure 5:
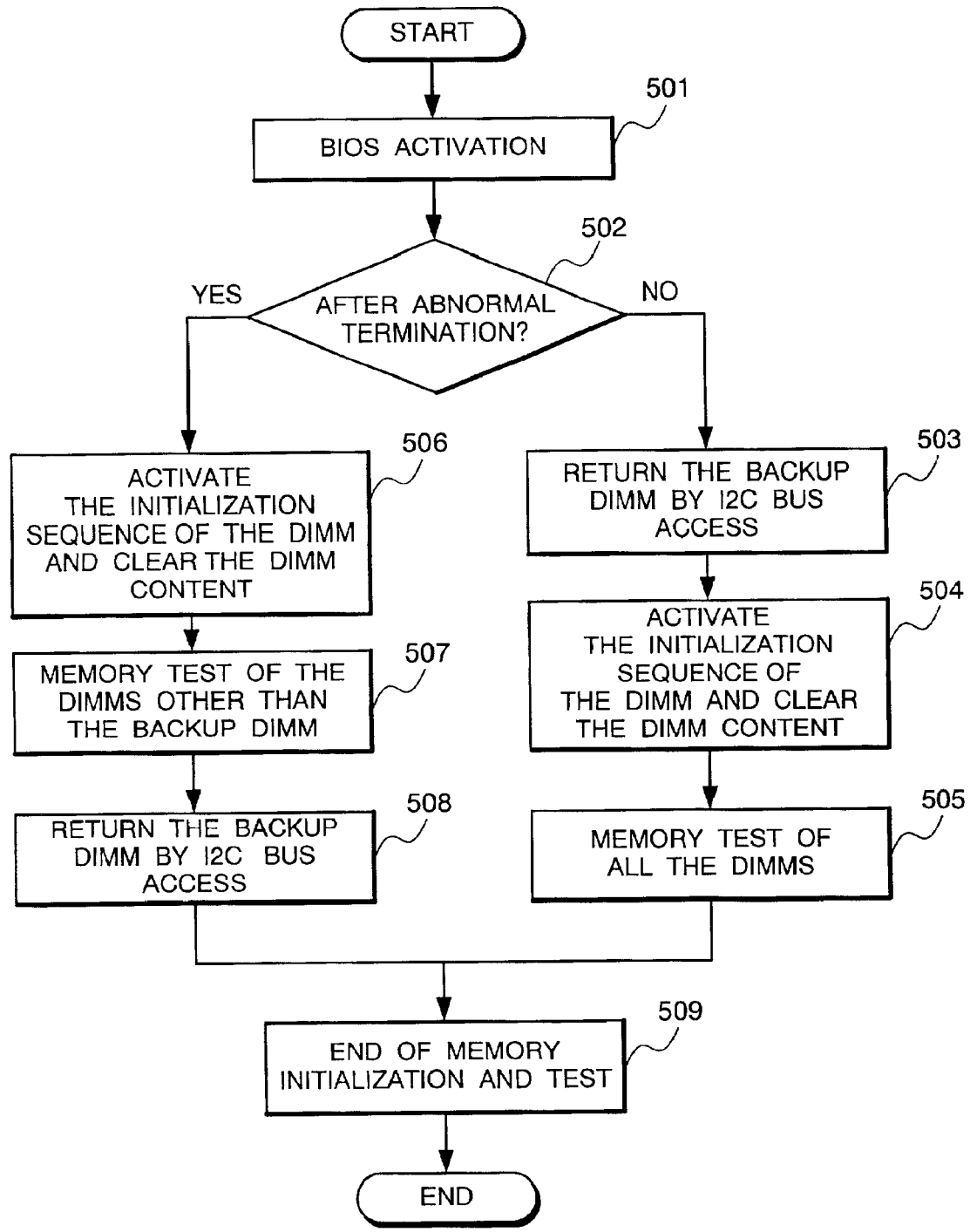
FIG. 5 is a flow chart for use in describing the BIOS processing at power-on of the NAS according to the first embodiment of the present invention.

The processing at the NAS server activation will be described this time. FIG. 5 is a flow chart for use in describing the BIOS processing at power-on of NAS according to the embodiment.

The memory protection unit 10 continuously keeps a state of cutting off the memory controller 30 from the backup-objective DIMMs 31, also after the power activation. The DIMMs 31 are not returned from the low power mode simultaneously with the power activation. This is because the memory controller 30 is not initialized yet and a refresh instruction is not issued to the DIMMs 31, with a fear of losing the data within the DIMMs 31.

The BIOS after the power activation examines whether the last termination is normal or abnormal (Steps 501 and 502): when this activation is after the normal termination, it issues a switching instruction to the memory protection unit 10 through the I2C bus for SPD (Step 503).

The memory protection unit 10, upon receipt of the instruction, asserts CKE within the command signal, returns the DIMMs from the low power mode, makes a connection between the command signal and the memory controller and a connection with the I2C bus for SPD while controlling the switches 11 and 12, and passes a control right of the DIMM to the memory controller (Step 504). Thereafter, an ordinal memory initialization sequence and memory test will be performed (Step 505).

While, when this activation is after the abnormal termination, after initialization of the memory that is not the backup object (Step 506) and completion of the memory test (Step 507), the BIOS issues a switching instruction to the memory protection unit 10 through the I2C bus for SPD and returns the backup-objective DIMMs (Step 508).

A computer system according to the embodiment can be realized, needless to say, by the hardware, and by loading into a memory of the computer processor, a computer program having each function; the processing of nonvolatilizing a main memory by the memory protection unit 10, the processing of quicker response of registration completion of the write data to a client than the conventional technique, the processing of memory initialization at a system activation according to the state of the last termination, and the like. The computer program is stored in a storing medium 90 such as a magnetic disk, a semiconductor memory, and the like. It is loaded from the storing medium into the computer processor, to control the operation of the computer processor, thereby realizing the above mentioned respective functions.

Although the present invention has been described with a preferred embodiment, it is not restricted to the above embodiment and various modifications can be considered and performed within the technical sprit.

As set forth hereinabove, the computer system according to the present invention can achieve the following effects.

First, since it can monitor the power supply to a main memory and switch a control of the main memory and the power supply immediately in the event of power-down, it is possible to nonvolatilize the main memory itself without spoiling the processing speed of the memory, thereby effectively preventing from loss of data caused by unexpected power-down and reset. Therefore, in the NAS server and the File Server, write data from a client can be processed more quickly and more safely.

Second, since the computer system of the present invention nonvolatilizes the main memory itself, it is not necessary to transfer the write data from a memory to the NVRAM card, thereby decreasing the load of the PCI bus and enabling a lot of data processing from a client, with high performance, compared with the conventional structure of putting the NVRAM card on the PCI bus.

Third, though the conventional server notifies a client of the write completion when writing data from a memory into the hard disk or the NVRAM card is completed after receiving transmission data from the client in the memory, according to the present invention, the write completion can be notified to a client at the instant of receiving and writing data in a memory. Therefore, the write processing ability in response to a client is extremely improved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A server for establishing communication upon receipt of access from a client terminal through a network, comprising:
   a memory protection unit for protecting data stored in a volatile memory to be protected, in the event of a power failure, wherein said memory protection unit comprises:
      power monitoring means for detecting a power failure supplied to said memory to be protected; and
      switch controlling means for switching control of, and a power supply of, said memory to be protected;
   wherein when a failure is detected in a power supplied to said memory to be protected, control of said memory to be protected is switched to said memory protection unit, and said power supply is switched to a standby power, before data stored in said memory to be protected is damaged; and
   wherein said server notifies the client of write completion of data at a time when data sent from said client has been written into said memory to be protected.

2. The server as set forth in claim 1, wherein said switch controlling means finishes the switching, returns control of said memory to be protected to a CPU, and returns said power supply to an ordinary power supply, after resolution of the power failure.

3. The server as set forth in claim 1, wherein said memory to be protected comprises a SDRAM or a DIMM.

4. The server as set forth in claim 1, wherein said server comprises a Network Attached Storage or a File Server.

5. A server for establishing communication upon receipt of access from a client terminal through a network, comprising:
   a memory protection unit for protecting data stored in a volatile memory to be protected, in the event of a power failure, wherein said memory protection unit comprises:
      power monitoring means for detecting a power failure supplied to said memory to be protected; and
      switch controlling means for switching control of, and a power supply of, said memory to be protected;
   wherein when a failure is detected in a power supplied to said memory to be protected, control of said memory to be protected is switched to said memory protection unit, and said power supply is switched to a standby power, before data stored in said memory to be protected is damaged;
   wherein the server checks whether a last termination is abnormal or normal, at a power activation;
   wherein, when said last termination is abnormal, the server instructs said memory protection unit to return said memory to be protected after memories, other than said memory to be protected, are initialized at the activation; and
   wherein, when said last termination is normal, the server instructs said memory protection unit to return said memory to be protected, and thereafter initializes all memories at the activation.

6. A server for establishing communication upon receipt of access from a client terminal through a network, comprising:
   a memory protection unit for protecting data stored in a volatile memory to be protected, in the event of a power failure, wherein said memory protection unit comprises:
      power monitoring means for detecting a power failure supplied to said memory to be protected; and
      switch controlling means for switching control of, and a power supply of, said memory to be protected;
   wherein when a failure is detected in a power supplied to said memory to be protected, control of said memory to be protected is switched to said memory protection unit, and said power supply is switched to a standby power, before data stored in said memory to be protected is damaged; and
   wherein said switch controlling means switches said memory to be protected to a low power mode at a time of switching said power supply of said memory to the standby power.

7. A server for establishing communication upon receipt of access from a client terminal through a network, comprising:
   a memory protection unit for protecting data stored in a volatile memory to be protected, in the event of a power failure, wherein said memory protection unit comprises:
      power monitoring means for detecting a power failure supplied to said memory to be protected; and
      switch controlling means for switching control of, and a power supply of, said memory to be protected;
   wherein when a failure is detected in a power supplied to said memory to be protected, control of said memory to be protected is switched to said memory protection unit, and said power supply is switched to a standby power, before data stored in said memory to be protected is damaged; and
   wherein said memory protection unit performs backup processing on data stored in said memory, in response to a user's operation, after the switching.

8. A server for establishing communication upon receipt of access from a client terminal through a network, comprising:
   a memory protection unit for protecting data stored in a volatile memory to be protected, in the event of a power failure, wherein said memory protection unit comprises:
      power monitoring means for detecting a power failure supplied to said memory to be protected; and
      switch controlling means for switching control of, and a power supply of, said memory to be protected;
   wherein when a failure is detected in a power supplied to said memory to be protected, control of said memory to be protected is switched to said memory protection unit, and said power supply is switched to a standby power, before data stored in said memory to be protected is damaged; and
   wherein said memory protection unit has a switch on an I2C bus between SPD of said memory to be protected, which comprises a DIMM, and a memory controller, to cut off a connection between the SPD and the memory controller, in the above switched state.

9. The server as set forth in claim 8, wherein said memory protection unit controls said SPD of said memory to be protected through said I2C bus.

10. A computer system for establishing mutual communication between a client terminal and a server through a network, wherein said server comprises a memory protection unit for protecting data stored in a volatile memory to be protected in the event of a power failure, said memory protection unit comprising:

power monitoring means for detecting a power failure supplied to said memory to be protected; and switch controlling means for switching control of and a power supply of said memory to be protected;

wherein when a failure is detected in a power supplied to said memory to be protected, control of said memory to be protected is switched to said memory protection unit, and said power supply is switched to a standby power, before data stored in said memory to be protected is damaged; and wherein said server notifies said client of write completion of data at a time when data sent from said client has been written into said memory to be protected.

11. The computer system as set forth in claim 10, wherein said switch controlling means finishes the switching, returns control of said memory to be protected to a CPU of said server, and returns said power supply to an ordinary power supply, after resolution of the power failure.

12. The computer system as set forth in claim 10, wherein said server comprises a Network Attached Storage or a File Server.

13. A computer system for establishing mutual communication between a client terminal and a server through a network, wherein said server comprises a memory protection unit for protecting data stored in a volatile memory to be protected in the event of a power failure, said memory protection unit comprising:

power monitoring means for detecting a power failure supplied to said memory to be protected; and switch controlling means for switching control of and a power supply of said memory to be protected;

wherein when a failure is detected in a power supplied to said memory to be protected, control of said memory to be protected is switched to said memory protection unit, and said power supply is switched to a standby power, before data stored in said memory to be protected is damaged;

wherein said server checks whether a last termination is abnormal or normal, at a power activation;

wherein, when said last termination is abnormal, said server instructs said memory protection unit to return said memory to be protected after memories, other than said memory to be protected, are initialized at the activation; and wherein, when said last termination is normal, said server instructs said memory protection unit to return said memory to be protected and thereafter initializes all memories at the activation.

14. A computer system for establishing mutual communication between a client terminal and a server through a network, wherein said server comprises a memory protection unit for protecting data stored in a volatile memory to be protected in the event of a power failure, said memory protection unit comprising:

power monitoring means for detecting a power failure supplied to said memory to be protected; and switch controlling means for switching control of and a power supply of said memory to be protected;

wherein when a failure is detected in a power supplied to said memory to be protected, control of said memory to be protected is switched to said memory protection unit, and said power supply is switched to a standby power, before data stored in said memory to be protected is damaged; and wherein said switch controlling means switches said memory to be protected to a low power mode at a time of switching said power supply of said memory to the standby power.

15. A memory management method of a server for establishing communication upon receipt of access from a client terminal through a network, comprising:

detecting a power failure supplied to a memory to be protected; and switching control of and a power supply of said memory to be protected;

notifying said client of write completion of data at a time when data sent from said client has been written into said memory to be protected;

wherein when a failure is detected in a power supplied to said memory to be protected, control of said memory to be protected is cut off from a CPU, and said power supply is switched to a standby power, before said memory to be protected is damaged, so as to protect data stored in said memory to be protected, in the event of a power failure.

16. The memory management method as set forth in claim 15, further comprising finishing the switching, returning control of said memory to be protected to a CPU, and returning said power supply to an ordinary power supply, after resolution of the power failure.

17. The memory management method as set forth in claim 15, wherein said memory to be protected comprises a SDRAM or a DIMM.

18. A memory management method of a server for establishing communication upon receipt of access from a client terminal through a network, comprising:

detecting a vower failure supplied to a memory to be protected;

switching control of and a power supply of said memory to be protected;

checking whether a last termination is abnormal or normal, at a power activation;

returning said memory to be protected after initializing memories other than said memory to be protected at the activation, when said last termination is abnormal; and returning said memory to be protected and thereafter initializing all memories at the activation when said last termination is normal;

wherein when a failure is detected in a power supplied to said memory to be protected, control of said memory to be protected is cut off from a CPU, and said power supply is switched to a standby power, before said memory to be protected is damaged, so as to protect data stored in said memory to be protected, in the event of a power failure.

19. A memory management method of a server for establishing communication upon receipt of access from a client terminal through a network, comprising:

detecting a power failure supplied to a memory to be protected;

switching control of and a power supply of said memory to be protected; and switching said memory to be protected to a low power mode at a time of switching said power supply of said memory to the standby power;

wherein when a failure is detected in a power supplied to said memory to be protected, control of said memory to be protected is cut off from a CPU, and said power supply is switched to a standby power, before said memory to be protected is damaged, so as to protect data stored in said memory to be protected, in the event of a power failure.

20. A memory management method of a server for establishing communication upon receipt of access from a client terminal through a network, comprising:

detecting a power failure supplied to a memory to be protected;

switching control of and a power supply of said memory to be protected; and performing backup processing on data stored in said memory, in response to a user's operation, after the switching;

wherein when a failure is detected in a power supplied to said memory to be protected, control of said memory to be protected is cut off from a CPU, and said power supply is switched to a standby power, before said memory to be protected is damaged, so as to protect data stored in said memory to be protected, in the event of a power failure.

21. A memory management method of a server for establishing communication upon receipt of access from a client terminal through a network, comprising:

detecting a power failure supplied to a memory to be protected;

switching control of and a power supply of said memory to be protected; and with a switch provided on an I2C bus between SPD of said memory to be protected, which comprises a DIMM, and a memory controller, cutting off a connection between the SPD and the memory controller, in the switched state;

wherein when a failure is detected in a power supplied to said memory to be protected, control of said memory to be protected is cut off from a CPU, and said power supply is switched to a standby power, before said memory to be protected is damaged, so as to protect data stored in said memory to be protected, in the event of a power failure.

22. The memory management method as set forth in claim 21, further comprising controlling said SPD of said memory to be protected through said I2C bus.

23. A memory management program of a server for establishing communication upon receipt of access from a client terminal through a network, comprising:

detecting a power failure supplied to a memory to be protected;

switching control of and a power supply of said memory to be protected; and notifying said client of write completion of data at a time when data sent from said client has been written into said memory to be protected;

wherein when a failure is detected in a power supplied to said memory to be protected, the control of said memory to be protected is cut off from a CPU, and said power supply is switched to a standby power, before said memory to be protected is damaged, so as to protect data stored in said memory to be protected in the event of a power failure.

24. The memory management program as set forth in claim 23, further comprising finishing the switching, returning control of said memory to be protected to said CPU, and returning said power supply to an ordinary power supply, after resolution of the power failure.

25. A memory management program of a server for establishing communication upon receipt of access from a client terminal through a network, comprising:

detecting a power failure supplied to a memory to be protected;

switching control of and a power supply of said memory to be protected;

checking whether a last termination is abnormal or normal, at the power activation;

returning said memory to be protected after initializing memories other than said memory to be protected at the activation when said last termination is abnormal; and returning said memory to be protected and thereafter initializing all memories at the activation when said last termination is normal;

wherein when a failure is detected in a power supplied to said memory to be protected, the control of said memory to be protected is cut off from a CPU, and said power supply is switched to a standby power, before said memory to be protected is damaged, so as to protect data stored in said memory to be protected in the event of a power failure.

* * * * *